United States Patent [19]

Cai et al.

[11] Patent Number: 5,591,807
[45] Date of Patent: Jan. 7, 1997

[54] POLYIMINE/POLYISOCYANATE COATING COMPOSITION CONTAINING POLYMERIC ANHYDRIDE

[75] Inventors: Rubing Cai, Westmont; Walter E. Hawrysko, Richton Park, both of Ill.

[73] Assignee: The Sherwin-Williams Company, Cleveland, Ohio

[21] Appl. No.: 448,243

[22] Filed: May 23, 1995

[51] Int. Cl.$^6$ ..................................................... C08F 8/32
[52] U.S. Cl. ........................ 525/381; 525/131; 525/374; 525/379; 525/382; 525/386; 528/45; 528/52; 528/64
[58] Field of Search ................................. 525/374, 381, 525/131; 528/45, 52, 64

[56] References Cited

U.S. PATENT DOCUMENTS

| | | |
|---|---|---|
| 3,267,078 | 8/1966 | Damusla . |
| 3,420,800 | 1/1969 | Haggis . |
| 3,553,118 | 1/1971 | Brizgys . |
| 3,567,692 | 3/1971 | Haggis et al. . |
| 3,637,903 | 1/1972 | Brizgys . |
| 4,619,955 | 10/1986 | Druetzler . |
| 4,847,319 | 7/1989 | Bandlish . |
| 4,866,103 | 9/1989 | Cassidy et al. . |
| 5,087,661 | 2/1992 | Aoki et al. . |
| 5,126,170 | 6/1992 | Zwiener ........................ 427/385.5 |
| 5,173,560 | 12/1992 | Gras et al. . |
| 5,214,086 | 5/1993 | Mormile et al. . |
| 5,227,243 | 7/1993 | Shalati et al. . |
| 5,236,741 | 8/1993 | Zwiener et al. . |
| 5,243,012 | 9/1993 | Wicks et al. . |
| 5,360,642 | 11/1994 | Chandalia et al. . |
| 5,412,056 | 5/1995 | Zwiener et al. . |
| 5,466,771 | 11/1995 | Hicks ............................................ 528/64 |

FOREIGN PATENT DOCUMENTS

| | | |
|---|---|---|
| 164520 | 8/1987 | European Pat. Off. . |
| 1110655 | 4/1968 | United Kingdom . |

OTHER PUBLICATIONS

Dr. S. A. Jorissen, R. W. Rumer and Dr. D. A. Wicks, *Higher Solids Polyurethane Coatings*, Presented at the Water-borne & Higher Solids and Powder Coatings Symposium, Feb. 26-28, 1992.

M. Bock and R. Halpaap, *New Developments in Polyketimine–Polyisocyanate Coatings—Their Chemistry and Applications*, Sep. 1986.

Christian Zwiener, Lutz Schmalstieg and Michael Sonntag, *New Concepts For Two–Pack Polyurethane Coatings*, Euro-Coat Oct. 1992, pp. 588–600.

Primary Examiner—Fred Zitomer
Attorney, Agent, or Firm—Heidi A. Boehlefeld; Robert E. McDonald; Steven W. Tan

[57] ABSTRACT

A coating composition having extended pot-life and excellent cure at ambient conditions. The coating composition comprises (i) at least one imine, (ii) a polyisocynate having an average of at least two isocyanate groups per molecule, (iii) at least one polyaspartic ester, and (iv) an anhydride functional polymer; wherein the coating composition is substantially free of hydroxy functionality.

11 Claims, No Drawings

POLYIMINE/POLYISOCYANATE COATING COMPOSITION CONTAINING POLYMERIC ANHYDRIDE

BACKGROUND OF THE INVENTION

The present invention relates to curable compositions having high solids and low VOC. These curable compositions are especially useful as coatings and may typically be used as primers, topcoats or as clearcoats and/or basecoats in clearcoat/basecoat compositions. In particular, this invention is directed to a coating composition providing extended pot life and excellent cure and consisting of the combination of (i) at least one imine having the structure

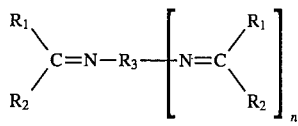

wherein n is 0 to 30. $R_1$ and $R_2$ are selected from the group consisting of hydrogen, alkyl, aryl, cycloaliphatic, and substituted alkyl, aryl, and cycloaliphatic groups; and $R_1$ and $R_2$ may be the same or different; and $R_3$ is selected from the group consisting of aliphatic, aromatic, arylaliphatic, and cycloaliphatic groups and which may also contain O, N, S, or Si; (ii) a polyisocyanate having an average of at least two isocyanate groups per molecule; (iii) at least one polyaspartic ester; and (iv) an anhydride functional polymer; wherein the coating composition is substantially free of hydroxyl functionality.

Two-component curable mixtures comprising polyisocyanates and active hydrogen-containing compounds, such as polyols or polyamines, are well-known in the art to provide excellent performance and cure at low temperatures. However, due to the reactivity of the isocyanates and the active hydrogen-containing compounds, it is often difficult to obtain long pot-lives of the mixture of polyisocyanate and active hydrogen-containing material and yet still enjoy the benefits of rapid cure. This is especially true for low VOC materials, which will incorporate relatively low levels of solvent and will frequently involve low molecular weight, but highly reactive, starting materials.

Accordingly, it is an object of the present invention to provide a two component coating composition having extended pot-life and excellent cure. It is a further object of the present invention to provide an ambient cured coating composition having relatively low viscosity and low VOC. It is an even further object of the present invention to provide an ambient cured coating composition which is capable of providing an excellent cure in very dry and cool ambient conditions.

SUMMARY OF THE INVENTION

The present invention relates to a novel coating composition. The coating composition comprises:

(i) an imine having the structure

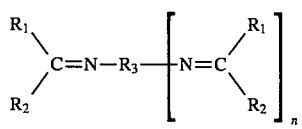

wherein
n is 0 to 30, $R_1$ and $R_2$ are selected from the group consisting of hydrogen, alkyl, aryl, cycloaliphatic, and substituted alkyl, aryl, and cycloaliphatic groups; and $R_1$ and $R_2$ may be the same or different; and $R_3$ is selected from the group consisting of aliphatic, aromatic, arylaliphatic, and cycloaliphatic groups and which may also contain O, N, S, or Si;

(ii) a polyisocyanate having an average of at least two isocyanate groups per molecule;

(iii) at least one polyaspartic ester; and (iv) an anhydride functional polymer;

wherein the coating composition is substantially free of hydroxyl groups.

The anhydride functional polymer has at least two anhydride groups per molecule and comprises the reaction product of at least one unsaturated monomer having anhydride functionality and at least one other ethylenically unsaturated monomer copolymerizable therewith.

DETAILED DESCRIPTION OF THE INVENTION

The reactivity of primary polyamines toward polyisocyanates is so great that it is difficult to process and apply coatings based on primary polyamine/polyisocyanate, even with sophisticated two-component equipment. However, by blocking the free amino groups of primary polyamines with ketones or aldehydes to form ketimines or aldimines, respectively, the reactivity toward isocyanates can be controlled. The present invention is directed to a curable coating composition which is substantially free of hydroxyl groups and which comprises an aldimine or ketimine, at least one polyaspartic ester, a polyisocyanate having an average of at least two isocyanate groups per molecule, and an anhydride functional polymer.

1. Imine Compounds

The imine compounds which are useful in the present invention may be represented by the formula:

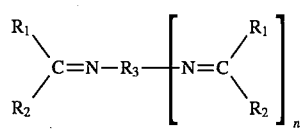

wherein n is 0 to 30, and preferably n is 0 to 5; $R_1$ and $R_2$ are hydrogen, an alkyl, aryl, cycloaliphatic, or substituted alkyl, aryl, or cycloaliphatic group; and $R_1$ and $R_2$ may be the same or different; and $R_3$ is an aliphatic, aromatic, arylaliphatic or cycloaliphatic group which may also contain O, N, S, or Si.

These imine compounds are prepared by the reaction of certain carbonyl compounds such as aldehydes and ketones with amines. Representative carbonyl compounds which may be used to form the imine include ketones such as acetone, methyl ethyl ketone, methyl isopropyl ketone, methyl isobutyl ketone, diethyl ketone, benzyl methylketone, diisopropyl ketone, cyclopentanone, and cyclohexanone, and aldehydes such as acetaldehyde, formaldehyde, propionaldehyde, isobutyraldehyde, n-butyraldehyde, heptaldehyde and cyclohexyl aldehydes. Representative amines which may be used to form the imine include ethylene diamine, propylene diamine, tetramethylene diamine, and cycloaliphatic diamines such as those having the following structures:

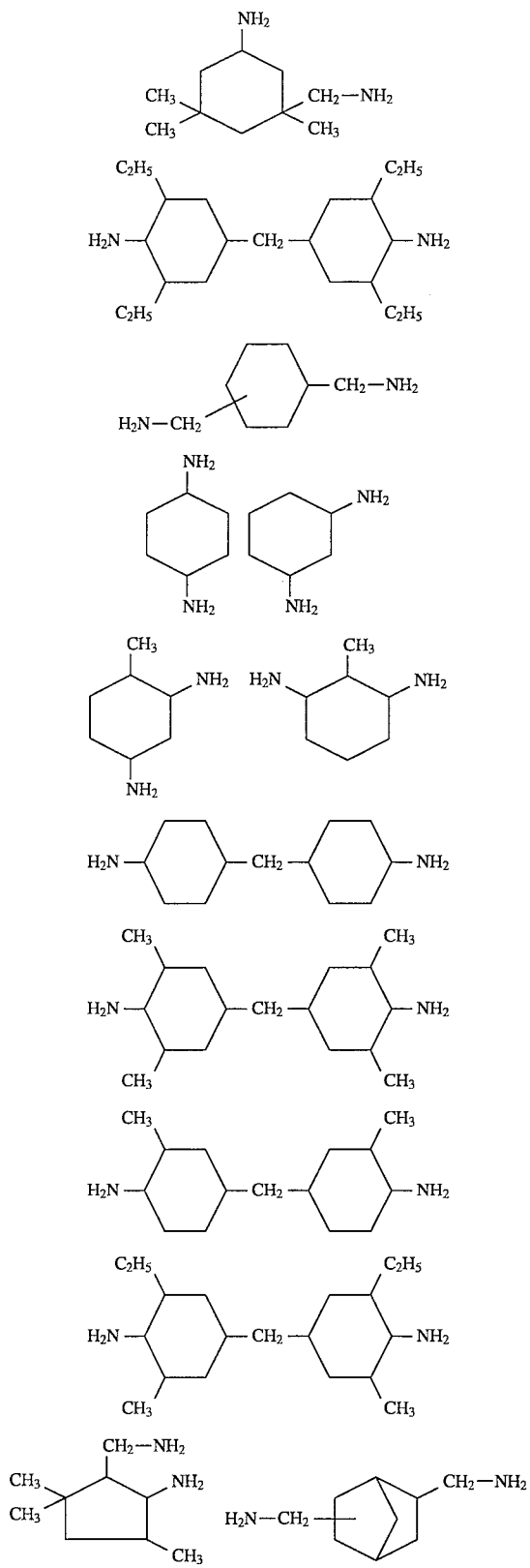

A preferred imine for the present invention is the reaction product of 2 moles of isobutyraldehyde and one mole of isophorone diamine, and has the following structure:

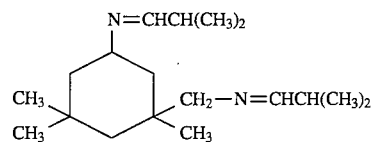

The chemical basis for the imine/polyisocyanate systems of the present invention is a molecular rearrangement to form a reactive species and/or the splitting of the ketimine or aldimine (reversing the reactions by which it is formed) into a ketone or aldehyde, respectively, and an amine by the reaction of the ketimine or aldimine with atmospheric moisture. This reaction is primarily responsible for the curing of the coating.

2. Polyisocyanate Compounds

Polyisocyanates useful in the compositions of this invention have an average of at least two isocyanates per molecule. Representative polyisocyanates useful in the present invention include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanatomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4-diphenyl, 1,5-naphthalene and 1,4-naphthalene diisocyanates; the aliphatic-aromatic compounds such as 4,4-diphenylene methane, 2,4- or 2,6-toluene or mixtures thereof, 4,4'-toluidine, and 1,4-xylylene diisocyanates; the nuclear substituted aromatic compounds such as dianisdine diisocyanate, 4,4'-diphenylether diisocyanate and chlorodiphenylene diisocyanate; the triisocyanates such as triphenyl methane-4,4',4"-triisocyanate, 1,3,5-triisocyanatebenzene and 2,4,6-triisocyanate toluene; and the tetraisocyanates such as 4,4'-diphenyl-dimethyl methane -2,2',5,5'-tetraisocyanate; the polymerized polyisocyanates such as dimers and trimers, and other various polyisocyanates containing biuret, urethane, and/or allophanate linkages. Preferred polyisocyanates include dimers and trimers of hexamethylene diisocyanate and mixtures thereof.

3. Polyaspartic Ester Compounds

The polyaspartic ester of the present invention is reactive with the polyisocyanate and functions as a reactive diluent. The addition of at least one polyaspartic ester reduces viscosity build-up without adversely effecting the dry time of the coating composition. In addition, the polyaspartic ester provides excellent weathering resistance and durability to the cured coating. Particularly useful polyaspartic esters include those having the formula:

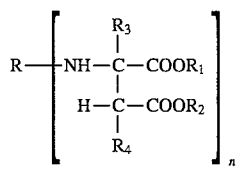

wherein R is an organic group which has a valency of n and is inert towards isocyanate groups, $R_1$ and $R_2$ may be identical or different and represent organic groups which are inert towards isocyanate groups, and $R_3$ and $R_4$ may be identical or different and represent hydrogen or organic groups which are inert towards isocyanate groups, and n is an integer with a value of at least 2. Such polyaspartic esters are taught in U.S. Pat. No. 5,126,170, which is hereby incorporated by reference. Preferred polyaspartic esters include the following:

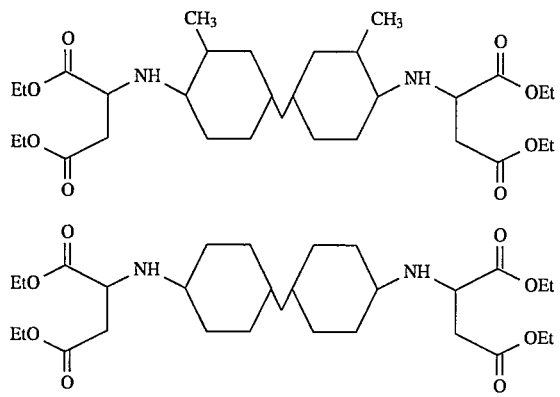

available from Miles as Desmophen XP-7053 and Desmophen XP-7068, respectively.

4. Anhydride Functional Polymer

Polymeric anhydrides having number average molecular weights between 500 and 7,000 are useful in the practice of the present invention. Preferred in the practice of the present invention is the use of free radical addition polymers, such as acrylic polymers having anhydride functionality. These are conveniently prepared as is well known in the art by the polymerization under free radical addition polymerization conditions of at least one unsaturated monomer having anhydride functionality, such as maleic anhydride, citraconic anhydride, itaconic anhydride, propenyl succinic anhydride, etc. with other ethylenically unsaturated monomers such as the esters of unsaturated acids, vinyl compounds, styrene-based materials, allyl compounds and other copolymerizable monomers. The monomers which are copolymerized with the unsaturated anhydride should, of course, be free of any functionality which could react with the anhydride group during polymerization and could include copolymerizable acids such as acrylic acid or methacrylic acid. The anhydride functional polymers can be conveniently prepared by conventional free radical polymerization techniques. Typically the polymerization will be conducted in an inert solvent and in the presence of a catalyst at temperatures ranging from 35° C. to about 200° C. An especially preferred anhydride functional polymer comprises the free radical additional polymerization product of (a) 5 to 40, and especially 14 to about 25, weight percent of an ethylenically unsaturated monoanhydride, and (b) 60 to 95, and especially 75 to 85, weight percent of at least one other ethylenically unsaturated monomer copolymerizable with the ethylenically unsaturated anhydride. Specific examples of such polymeric anydrides are taught is U.S. Pat. No. 5,227,243, which is incorporated herein by reference. A particularly preferred polymeric anhydride comprises the reaction product of maleic anhydride, butyl methacrylate and isobutyl methacrylate.

Typically the coating composition of the present invention comprises 1–40 percent by weight of the imine compound described above, 20–60 percent by weight of a polyisocyanate having an average of at least two isocyanate groups per molecule, 1–50 percent by weight of a polyaspartic ester and 1–20 percent by weight of an anhydride functional polymer. Preferably, the coating composition of the present invention comprises 5–15 percent by weight of the imine compound described above, 30–40 percent by weight of a polyisocyanate having an average of at least two isocyanate groups per molecule, 25–35 percent by weight of a polyaspartic ester and 5–15 percent by weight of an anhydride functional polymer.

Typically, the coating composition will include other additives to adjust the performance and application characteristics of the coating. Normally, the coating composition will include an inert organic solvent ranging from 1.0–90%, and preferably 1.0–50% by weight based upon the total weight of the coating. Useful inert organic solvents for the coating composition include aromatic hydrocarbons such as toluene, xylene, ethyl benzene, aromatic naphtha, etc.; aliphatic hydrocarbons such as mineral spirits, hexane, aliphatic naphtha, etc.; esters such as butyl acetate, ethylene glycol monoethyl ether acetate, ethylene glycol monobutyl ether acetate, etc.; and ketones such as methyl amyl ketone and methyl isobutyl ketone.

The coating may also contain other additives such as flow agents, catalysts, diluents, flexibilizers, ultraviolet light absorbers and stabilizers, etc. A particularly useful flexibilizer is an isocyanate functional urethane that is the reaction product of (a) an aliphatic polyisocyanate; (b) at least one monofunctional alcohol containing an ether or carboxyl oxygen; and (c) at least one diol. Examples of such flexibilizers are taught in U.S. Pat. No. 4,619,955, which is hereby incorporated by reference.

The coatings of this invention may typically be applied to any substrate such as metal, plastic, wood, glass, synthetic fibers, etc, by brushing, dipping, roll coating, flow coating, spraying or other method conventially employed in the coating industry. If desired, the substrates may be primed prior to application of the coatings of this invention.

One preferred application of the curable compositions of this invention relates to their use as clearcoats and/or basecoats in clearcoat/basecoat formulations. Low VOC clearcoats are an especially useful application of this invention.

Clearcoat/basecoat systems are well known, especially in the automobile industry where it is especially useful to apply a pigmented basecoat, which may contain metallic pigments, to a substrate and allow it to form a film followed by the application of a clearcoat. The basecoat composition may be any of the polymers known to be useful in coating compositions including the reactive compositions of this invention.

Typically the basecoat will include pigments conventially used for coating compositions and after being applied to a substrate, which may or may not previously have been primed, the basecoat will be allowed sufficient time to form a polymer film which will not be lifted during the application of the clearcoat. The basecoat may be heated or merely allowed to air-dry to form the film. Generally, the basecoat will be allowed to dry for about 1 to 20 minutes before application of the clearcoat. The clearcoat is then applied to the surface of the basecoat, and the system can be allowed to dry at room temperature or, if desired, can be force dried by baking the coated substrate at temperatures typically ranging up to about 350° F.

Typically, the clearcoat may contain ultraviolet light absorbers such as hindered amines at a level ranging up to about 6% by weight of the vehicle solids as is well known in the art. The clearcoat can be applied by any application method known in the art, but preferably will be spray applied. If desired, multiple layers of basecoat and/or clearcoat can be applied. Typically, both the basecoat and the clearcoat will each be applied to give a dry film thickness of about 0.2 to about 6, and especially about 0.5 to about 3.0, mils.

The following examples are intended to illustrate the invention. Unless otherwise stated, "parts" means parts-by-weight and "percent" is percent-by-weight.

EXAMPLE A

Polymeric Anhydride

A 4-neck, round bottomed flask equipped with mechanical stirrer, reflux condenser, thermometer, nitrogen inlet, water trap and fluid metering pump was charged with 1,280 parts xylene and 170.2 parts maleic anhydride. The materials were heated to reflux (139° C.) under nitrogen for a period of 15 minutes to remove water, and the reaction mixture was then cooled to (120° C.). To this solution was added a monomer mixture of 591.6 parts iosbutyl methacrylate, 918 parts butyl methacrylate, 122.4 parts methacrylic acid, 102 parts maleic anhydride, and 61.2 parts t-butyl peroctoate over a period of approximately 3 hours. Halfway through the monomer addition, 135.8 parts of maleic anhydride was charged. After completion of the monomer mixture, the reaction mixture was maintained at a temperature of 120° C. for a period of 15 minutes. A solution of 80 parts xylene and 10.2 parts t-butyl peroctoate was added to the reaction over a 45 minute period. After the completion of that addition, the reaction mixture was held for an additional 1.5 hours at 120° C., heated to reflux (136° C.) to remove water and the product was cut to 50% theoretical NVM by the addition of 680 parts xylene. the reaction mixture was allowed to cool to room temperature to obtain an anhydride functional polymer having an average molecular weight of about 4,000, a polydispersity of 2.3, and a theoretical anhydride equivalent weight of 490.

EXAMPLE B

Imine Solution

An imine solution was prepared according to the following recipe:

| Raw Material | Parts |
| --- | --- |
| Aldimine[1] | 153.69 |
| Desmophen LS2973 hindered amine[2] | 461.00 |
| Desmophen XP7053 hindered amine | 153.58 |
| Byk 370[3] | 2.10 |
| Tinuvin 384[4] | 43.97 |
| Tinuvin 292[5] | 14.97 |
| n-butyl acetate | 11.25 |

[1]Reaction product of 1 mole of isophorone diamine and 2 moles of isobutyraldehyde.
[2]Hindered amine Desmophen XP7068 at 90% in n-butyl acetate available from Miles.
[3]Flow control agent sold by Byk-Malinkrodt.
[4]UV absorber from Ciba-Geigy.
[5]Light stabilizer from Ciba-Geiby.

EXAMPLE C

Isocyanate Solution

An isocyanate solution was prepared according to the following recipe:

| Raw Material | Parts |
| --- | --- |
| TOLONATE HDT100 LV[6] | 707.88 |
| n-butyl acetate | 33.54 |
| methyl isobutyl ketone | 143.92 |

[6]Trimer of hexamethylene diisocyanate from Rhone-Poulenc.

EXAMPLE D

Reducer Solution

A reducer solution was prepared according to the following recipe:

| Raw Material | Parts |
| --- | --- |
| Polymeric anhydride of Example A | 338.33 |
| methyl isobutyl ketone | 387.33 |

COMPARATIVE EXAMPLE E

Reducer Solution

A reducer solution was prepared according to the folowing recipe:

| Raw Material | Parts |
| --- | --- |
| methyl isobutyl ketone | 660.79 |
| succinic anhydride | 6.06 |

COMPARATIVE EXAMPLE F

Reducer Solution

A reducer solution was prepared according to the following recipe:

| Raw Material | Parts |
| --- | --- |
| BYKETOL OK[7] | 63.42 |
| methyl n-amyl ketone | 60.56 |
| methyl isobutyl ketone | 543.42 |
| succinic anhydride | 3.05 |

[7]Flow control agent from Byk-Malinkrodt.

The imine solution, isocyanate solution and a reducer solution were combined to produce the coating compositions of Examples 1–3 shown in Table I.

TABLE I

| | Raw Material by Weight | | | | | |
| --- | --- | --- | --- | --- | --- | --- |
| Example | Imine Solution | Isocyanate Solution | Reducer D | Reducer E | Reducer F | VOC (lb/gal) |
| 1 | 43.06 | 44.54 | 12.40 | — | — | 2.0 |
| 2 | 43.06 | 44.54 | — | 11.38 | — | 2.1 |
| 3 | 43.06 | 44.54 | — | — | 11.38 | 2.1 |

The compositions of Examples 1–3 were spray applied to Q-steel panels which had been coated with a etching filler (E2G980 GBP® commercially available from The Sherwin-Williams Company), a sealer (E6H59 commercially available from The Sherwin-Williams Company) and a basecoat (ULTRA 7000® commercially available from The Sherwin-Williams Company), and then ambient cured to produce clear coatings having the performance charateristics shown in Table II.

TABLE II

Performance Characteristics of the Clearcoat

| | Example 1 | Example 2 | Example 3 |
|---|---|---|---|
| Temperature °F. | 73 | 73 | 73 |
| Humidity % | 21 | 21 | 21 |
| Viscosity #2 Zahn (sec) | 20.71 | 17.01 | 16.21 |
| 1 Hour Viscosity #2 Zahn (sec) | 32.12 | 22.05 | 19.18 |
| Dry Film (mil) | 2.9 | 2.6 | 2.5 |
| Handslick (min) | 35 | 50 | 60 |
| Dustfree (min) | 50 | 65 | 90 |
| KPH (1 day) | 31 | 32 | 39 |
| 20° Gloss | 85 | 85 | 84 |
| 60° Gloss | 92 | 91 | 91 |
| DOI | 99 | 99 | 99 |

While this invention has been described with respect to a number of specific embodiments, it is obvious that there are other variations and modifications which can be made without departing from the spirit and scope of the intention as more particularly set forth in the appended claims.

We claim:

1. A coating composition having extended pot life and excellent cure comprising:

(i) 1–40% by weight of an imine having the structure

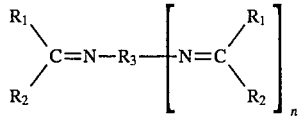

wherein
n is 0 to 30,
$R_1$ and $R_2$ are selected from the group consisting of hydrogen, alkyl, aryl, cycloaliphatic, and substituted alkyl, aryl, and cycloaliphatic groups; and $R_1$ and $R_2$ may be the same or different; and
$R_3$ is selected from the group consisting of aliphatic, aromatic, arylaliphatic, and cycloaliphatic groups and which may also contain O, N, S, or Si;

(ii) 20–60% by weight of a polyisocyanate having an average of at least two isocyanate groups per molecule;

(iii) 1–50% by weight of at least one polyaspartic ester; and (iv) 1–20% by weight of an anhydride functional polymer having an average of at least two cyclic carboxylic acid anhydride groups per molecule and comprising the addition polymerization reaction product of at least one unsaturated monomer having anhydride functionality and at least one other ethylenically unsaturated monomer copolymerizable therewith;
wherein the coating composition is substantially free of hydroxyl groups.

2. A coating composition having extended pot life and excellent cure comprising:

(i) 1–40% by weight of an imine having the structure

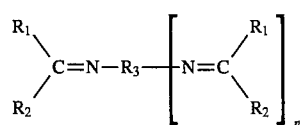

wherein
n is 0 to 5,
$R_1$ and $R_2$ are selected from the group consisting of hydrogen, alkyl, aryl, cycloaliphatic, and substituted alkyl, aryl, and cycloaliphatic groups; and $R_1$ and $R_2$ may be the same or different; and
$R_3$ is selected from the group consisting of aliphatic, aromatic, arylaliphatic, and cycloaliphatic groups and which may also contain O, N, S, or Si;

(ii) 20–60% by weight of a polyisocyanate having an average of at least two isocyanate groups per molecule;

(iii) 1–50% by weight of at least one polyaspartic ester; and (iv) 1–20% by weight of an anhydride functional polymer having an average of at least two cyclic carboxylic acid anhydride groups per molecule and comprising the addition polymerization reaction product of at least one unsaturated monomer having anhydride functionality and at least one other ethylenically unsaturated monomer copolymerizable therewith;
wherein the coating composition is substantially free of hydroxyl groups.

3. The coating composition of claim 1 wherein the polyisocyanate is selected from the group consisting of aliphatic, aromatic, and cycloalkylene diisocyanates, triisocyanates, tetraisocyanates, polymerized polyisocyanates, urethanes, biurets and allophanates.

4. The coating composition of claim 3 wherein the isocyanate functional resin is a dimer or trimer of hexamethylene diisocyanate or a blend of both.

5. The coating composition of claim 1 wherein said imine is the reaction product of 2 moles of isobutyraldehyde and one mole of isophorone diamine.

6. The coating composition of claim 1 wherein the anhydride functional polymer is the addition polymerization reaction product of:

(a) 5 to about 40 weight percent of an ethylenically unsaturated monoanhydride; and (b) 60 to 95 weight percent of at least one other ethylenically unsaturated monomer copolymerizable with the ethylenically unsaturated anhydride.

7. The coating composition of claim 6 wherein the monoanhydride is maleic anhydride.

8. The coating composition of claim 1 further comprising an isocyanate functional urethane which comprises the reaction product of:

(a) an aliphatic polyisocyanate;

(b) at least one monofunctional alcohol containing an ether or carboxyl oxygen; and (c) at least one diol.

9. The coating composition of claim 1 wherein the polyaspartic ester has the formula:

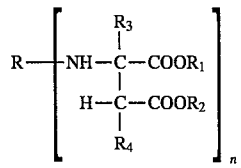

wherein R is an organic group which has a valency of n and is inert towards isocyanate groups, $R_1$ and $R_2$ may be identical or different and represent organic groups which are inert towards isocyanate groups, and $R_3$ and $R_4$ may be identical or different and represent hydrogen or organic groups which are inert towards isocyanate groups, and n is an integer with a value of at least 2.

10. The composition of claim 1 wherein the polyaspartic ester is selected from the group consisting of

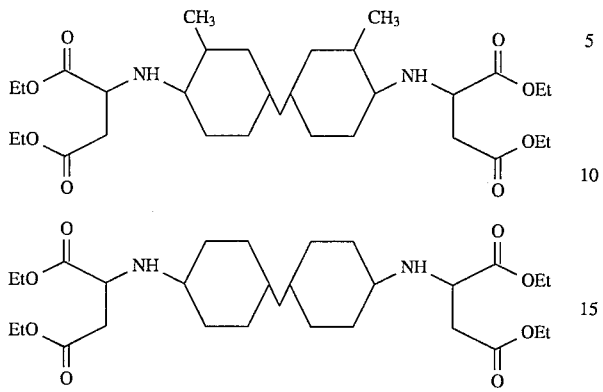

and mixtures thereof.

11. A coating composition having extended pot life and excellent cure comprising:

(i) 5–15 percent by weight of an imine having the structure

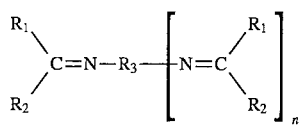

wherein
n is 0 to 30,
$R_1$ and $R_2$ are selected from the group consisting of hydrogen, alkyl, aryl, cycloaliphatic, and substituted alkyl, aryl, and cycloaliphatic groups; and $R_1$ and $R_2$ may be the same or different; and
$R_3$ is selected from the group consisting of aliphatic, aromatic, arylaliphatic, and cycloaliphatic groups and which may also contain O, N, S, or Si;

(ii) 30–40 percent by weight of a polyisocyanate having an average of at least two isocyanate groups per molecule;

(iii) 25–35 percent by weight of at least one polyaspartic ester; and (iv) 5–15 percent by weight of an anhydride functional polymer;

wherein the coating composition is substantially free of hydroxyl groups.

* * * * *